United States Patent [19]

Studdard

[11] Patent Number: 4,971,355
[45] Date of Patent: Nov. 20, 1990

[54] MOBILE HOME CHASSIS

[75] Inventor: Donald T. Studdard, Winfield, Ala.

[73] Assignee: Continental Conveyor & Equipment Co., Inc., Winfield, Ala.

[21] Appl. No.: 398,523

[22] Filed: Aug. 25, 1989

[51] Int. Cl.⁵ .............................................. B62D 63/06
[52] U.S. Cl. ..................................... 280/789; 280/799; 280/800
[58] Field of Search .......................... 280/789, 799, 800

[56] References Cited

U.S. PATENT DOCUMENTS

| 2,743,940 | 5/1956 | Bohlen | 280/789 |
| 2,791,439 | 5/1957 | Swanson | 280/789 |
| 3,520,551 | 1/1968 | Sellers | 280/789 |
| 4,131,301 | 12/1978 | Werner | 280/789 |

FOREIGN PATENT DOCUMENTS 229024 1/1959 Australia ............................... 280/789

Primary Examiner—Kenneth R. Rice
Attorney, Agent, or Firm—Pearne, Gordon, McCoy & Granger

[57] ABSTRACT

A frame or chassis for mobile homes and the like provides a pair of laterally spaced, parallel I-beams extending the length of the frame. Wood floor joists are mounted on top of the I-beams and extend laterally beyond the I-beams in both directions. One-piece uniriggers having substantial tensile strength but relatively minor column strength in compression are connected to their ends directly or indirectly to the ends of the floor joists. The uniriggers provide outrigger portions extending downwardly and inwardly to the adjacent I-beam and a cross member portion extending laterally between the I-beams. The uniriggers are welded to the bottoms of the I-beams and cooperate with the associated floor joist to provide a trusslike structure which prevents rolling action of the beams. The frame or chassis provides adequate strength and rigidity when the frame is being supported by wheels and axles for road transportation and also when the frame is supported at intervals around its periphery at a use location.

15 Claims, 3 Drawing Sheets

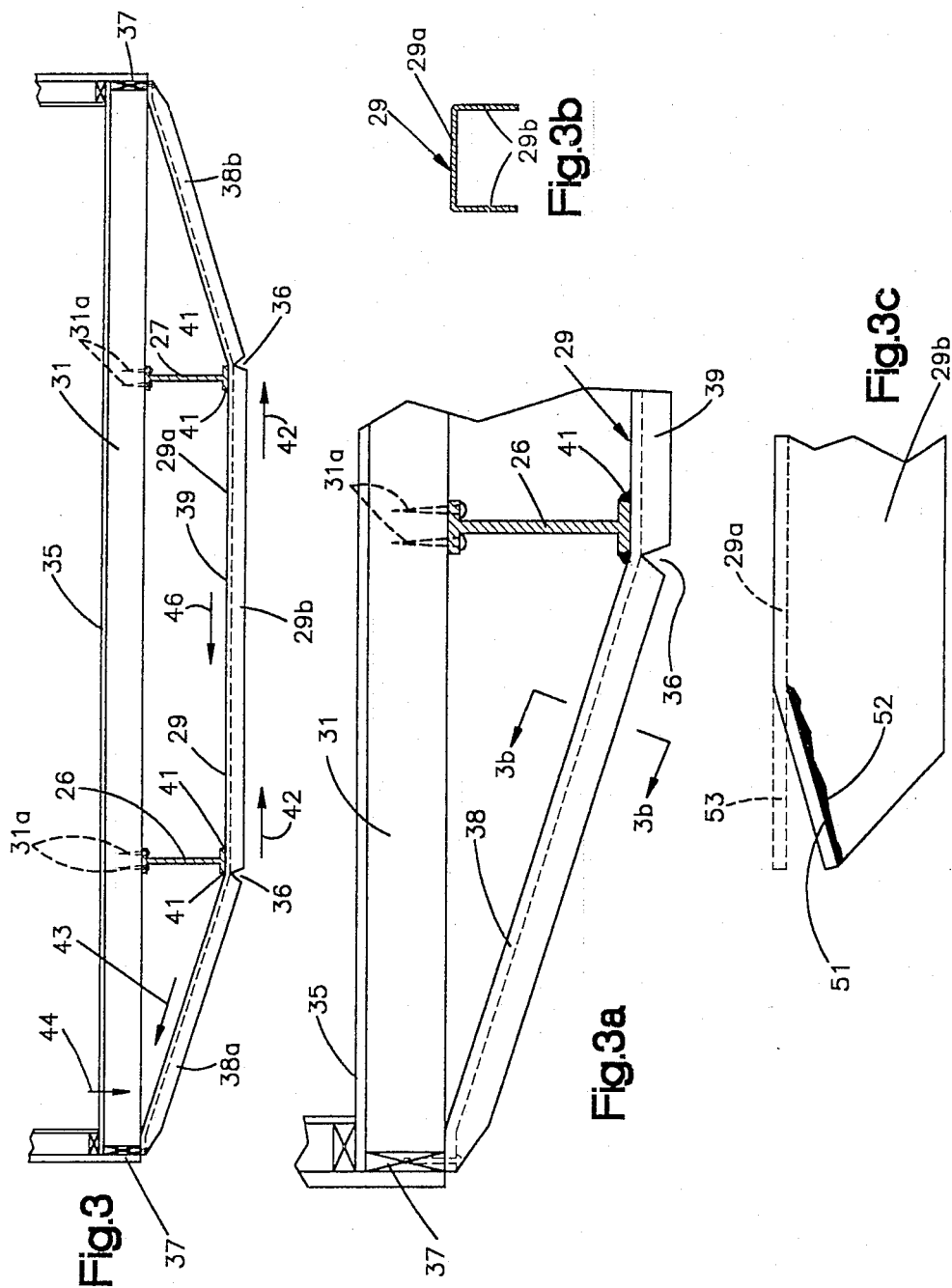

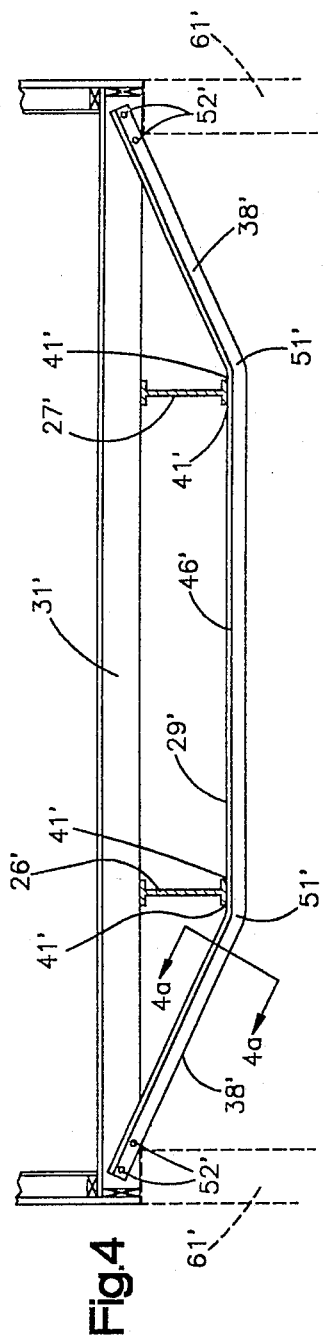

MOBILE HOME CHASSIS

BACKGROUND OF THE INVENTION

This invention relates generally to support frame structures for buildings, and more particularly to a novel and improved support frame or chassis for mobile homes and the like.

Mobile homes are provided with wheels and axles permitting them to be towed to a site where they are installed and used. Typically, such homes are constructed on a support frame including two lengthwise beams (usually I-beams) and transverse cross members and outriggers. The support frame also includes transverse floor joists.

The beams are selected to be relatively deep so that they provide substantial strength in a vertical direction. However, such deep beams must be braced or restrained against rolling by the cross members and outriggers. Further, in many instances, particularly in large mobile homes, multiple tandem axles are necessary to provide adequate load carrying capacity. Such axles generate substantial lateral loading on the beams when the home is maneuvered through turns. Therefore, the support frame must provide sufficient lateral strength to prevent rolling of the beams under such lateral loading.

When the home is installed on a site where it is to be used, it is also typical to support the unit on blocks at intervals along the periphery thereof. Therefore, the support frame is loaded in two entirely different ways. During road travel, the weight of the unit is supported by the wheels and axles and, in turn, is supported by the beams. Once installed, however, the weight is supported at intervals around the perimeter. When supported along the perimeter, the beams bridge between support positions to assist in transferring the load between the support positions and also assist in maintaining the units straight and level even when the support blocking is not perfectly straight level.

Generally in the past, the cross members and outriggers have been separate members which are separately installed and connected to the beams. Further, the outriggers have often been formed of triangular pieces of sheet metal having flanges for stiffeners. U. S. Letters Pat. Nos. 3,520,551 and 4,131,301 also describe other forms of outriggers. All of such outriggers require substantial amounts of weight-producing material and involve substantial manufacturing and installation costs.

SUMMARY OF THE INVENTION

The present invention provides a single structural member to replace two outriggers and the associated cross member. The single structural member (hereinafter called a "unirigger") results in weight and cost savings when compared to the prior art structures. The ends of the unirigger connect to the ends of the associated floor joists. From each end, the unirigger extends downwardly and inwardly to the underside of the adjacent beam to provide two outrigger portions. The unirigger also provides the cross member portion extending between the two beams. The ends of the cross member portion and the adjacent ends of the outrigger portion are secured to the underside of the beam, preferably by welding, and the ends of the unirigger are secured either to the associated floor joists or through the perimeter frame to the ends of the floor joists.

The unirigger is a straplike member which is capable of withstanding substantial tensile loading but provides low column strength. When a lateral load is applied to one or both of the two beams, tending to cause them to roll in one direction, a tensile load is applied to one end of the unirigger and, through its connection with the two beams, functions to resist the lateral load. The tensile load on the unirigger applies a bending load to the associated floor joists. However, since the associated floor joist is relatively deep and has substantial strength to resist bending, it cooperates with the unirigger to prevent rolling of the beams. In effect, a trusslike structure is provided in which the floor joists and the uniriggers cooperate to prevent rolling of the beams under lateral loading conditions. Consequently, the beams remain upright and provide the required strength.

Further, when the frame is supported at intervals along its periphery, the trusslike structure of the unirigger at the support positions supports the I-beams so that they can effectively function to bridge between support positions.

Since the unirigger is a single member, it is easily and economically installed by merely connecting the ends of the unirigger to the floor joists and the central portions of the unirigger to the underside of the beams. Further, the amount of material required to provide the unirigger is substantially less than prior art structures, so that the material costs and the weight of the structure are substantially reduced.

These and other aspects of this invention are illustrated in the accompanying drawings and are more fully described in the following specification.

BRIEF DESCRIPTION OF THE DRAWINGS

FIGS. 1 and 1a illustrate a typical prior art frame system for a mobile home or the like;

FIG. 1a is a fragmentary section taken along line 1a—1a of FIG. 1;

FIG. 3 is a cross section of the frame of a mobile home in accordance with the first embodiment of this invention;

FIG. 3a is an enlarged, fragmentary view of the embodiment illustrated in FIG. 3;

FIG. 3b is a cross section taken along line 3b—3b of FIG. 3a;

FIG. 3c is an enlarged, fragmentary view illustrating the formation of the ends of the uniriggers illustrated in FIG. 3;

FIG. 4 is a cross section of a frame for a mobile home in accordance with the second embodiment of this invention; FIG. 4a is a cross section of the unirigger taken along line 4a—4a of FIG. 4; and FIG. 5 is a cross section of a unirigger in accordance with the third embodiment of this invention.

DETAILED DESCRIPTION OF THE DRAWINGS

Figure 1:
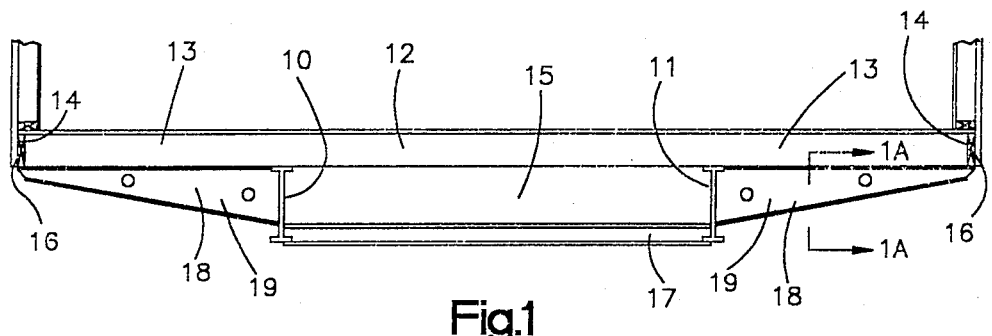
Figure 1A:
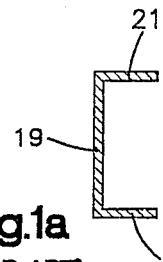

The frame for a typical prior art mobile home includes a pair of lengthwise extending, laterally spaced I-beams 10 and 11. In a typical prior art frame of the type illustrated in FIGS. 1 and 1a, wood floor joists 12 are mounted on the tops of the I-beams 10 and 11 and extend laterally with respect thereto. Further, the I-beams are positioned intermediate the ends of the floor joists 12 so that the floor joists provide lateral portions 13 which extend laterally beyond the adjacent of the I-beams to floor joist ends 14. Typically, a perimeter frame or plate member 16 is secured to the ends 14 of the floor joists 12 and extends the length of the structure.

In such prior art frame systems, a cross member 17 having a generally U-shaped channel cross section extends between the I-beams 10 and 11 and is welded at its ends to the I-beams. Generally, the cross members 17 are spaced at intervals along the length of the I-beams and are selected to provide a relatively low profile so that a longitudinal opening 15 will be provided extending lengthwise of the structure between the I-beams. Such an opening is often used to accommodate utility, such as ductwork plumbing and electrical services.

Laterally on each side of the two I-beams, the frame has normally been provided with prior art outriggers 18 formed of generally triangular pieces of sheet metal. Such outriggers provide a triangular web 19 and lateral stiffening flanges 21 and 22 (illustrated in FIG. 1a). The base of the triangular web and the adjacent ends of the flanges 21 and 22 have normally been welded to the associated I-beam and the upper flange 21 is secured to the associated floor joist.

Because these outriggers provided a substantially full web and stiffening flanges on each side thereof, a structural member has been provided which is relatively strong in bending. However, substantial amounts of material are required to produce such outriggers, and therefore the weight of the frame is substantially increased by their use. Further, substantial amounts of welding are required to fully connect the base ends of such outriggers to the I-beams.

With the present invention, the material requirements are substantially reduced, reducing the weight of the assembled frame, and substantial labor savings are achieved during the assembly of the frame.

Figure 2:
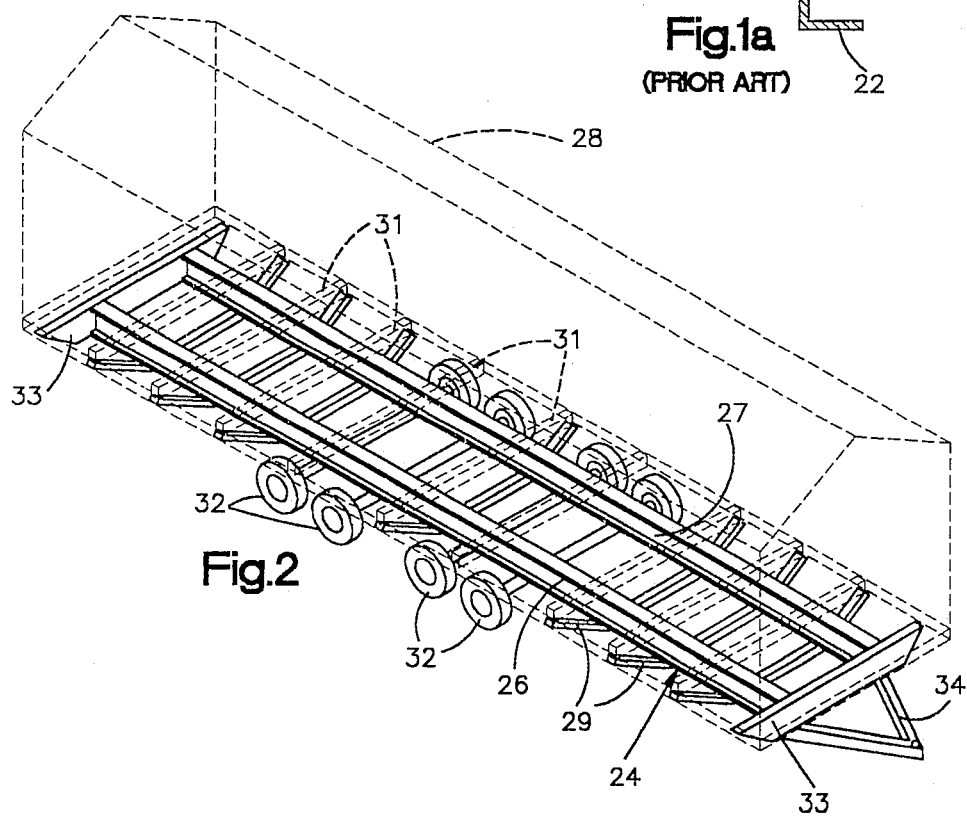
FIG. 2 is a schematic, perspective view of a frame of a mobile home incorporating the present invention.

FIG. 2 schematically illustrates a typical mobile home frame in accordance with the present invention. This particular frame assembly 24 includes a pair of laterally spaced, longitudinally extending I-beams 26 and 27. The frame is intended to support a typical mobile home, illustrated in phantom at 28.

The frame 24 includes a plurality of spaced uniriggers 29 which extend laterally with respect to the frame at intervals along the length of the I-beams. Also, the frame provides a plurality of floor joists 31. The floor joists are normally 2×6 or 2×8-inch wood beams which extend the full width of the frame and are mounted on the upper sides of the I-beams by fasteners 31a. The ends of the uniriggers 29 are directly or indirectly connected to the ends of the floor joists 31, as discussed in greater detail below.

The frame also includes several tandem wheels and axles 32. The number of the axles and the sizes of the wheels and tires are determined by the weight and size of the total mobile home. It is common to employ as many as four axles for large mobile homes in order to provide adequate load supporting capacity. The frame also includes end plates 33 at the ends of the I-beams and a tongue assembly 34 so that the frame can be connected to a suitable tow vehicle.

FIGS. 3 through 3c illustrate a first embodiment of this invention. In this embodiment, the unirigger 29 is formed with a U-shaped section, as best illustrated in FIG. 3b. The unirigger is preferably roll-formed from sheet metal, which may be, for example, about 0.090 inch thick. This embodiment is formed with a U-shaped cross section providing a web 29a and side flanges 29b. The flanges 29b are provided with notches 36 which permit the unirigger to be bent adjacent to the associated I-beams 26 and 27. The ends of the unirigger 29 in this embodiment are connected to the perimeter frame or plate member 37, which are, in turn, secured to the ends of floor joists 31. Flooring 35 is secured to the floor joist 31.

Extending inwardly from the ends of the unirigger are downwardly inwardly extending outrigger portions 38 which extend from the ends of the unirigger to the adjacent notch 36. Between the two notches 36 is a straight cross member portion 39. The unirigger is welded at 41 or otherwise suitably connected to the lower side of the I-beams 26 and 27.

Because the uniriggers are relatively long and are formed of relatively thin material, they have relatively low column strength to absorb compressive stress. However, in tension, they provide substantial strength. The joists, on the other hand, are relatively stiff and provide substantial resistance to bending stresses. In the combination, the joists cooperate with the associated unirigger to provide a trusslike structure in which the I-beams are supported and held against rolling movement in both directions.

For example, if a load is imposed upon the I-beams 26 and 27, tending to cause the lower edges thereof to roll in an anticlockwise direction as indicated by the arrows 42, a tensile stress is imposed in the outrigger portion 38a, represented by the arrow 43, which is transmitted to the end, where the outrigger portion 38a is secured to the perimeter frame member 37. This imposes a bending stress in the end of the floor joists 31 in a direction indicated by the arrow 44.

This stress is resisted by the stiffness of the floor joists, which prevents the associated end of the unirigger from moving any material distance from its normal position. Consequently, the lower edge of the beam 26 cannot rotate in the direction of the arrow 42. The cross member portion 39 is also subjected to a tensile strength in the direction indicated by the arrow 46. The cross member portion 39 thereby prevents the rolling of the lower portion of the I-beam 27. In this type of stress condition, the outrigger portion 38b does not materially resist the rolling movement, since such movement would tend to cause the outrigger portion 38b to be placed in compression. Since the unirigger is not strong in compression on column loading, the outrigger portion 38b does not provide any material restraint to rolling movement of the I-beams in an anticlockwise direction.

On the other hand, if the I-beams are subjected to a stress tending to cause clockwise rolling movement, the outrigger portion 38b is placed in tension along with the cross member portion to resist such movement. In that event, the outrigger portion 38a does not function in any material way to resist the rolling movement of the I-beam.

As mentioned previously, the I-beams are subjected to substantial lateral loading when the frame is supported on the wheels and is turned in one direction or the other, subjecting the tires to a scrubbing action. If necessary, additional stiffeners are provided in the area of the support of the axles and wheels 32 to further absorb such loading conditions. However, the uniriggers perform a substantial portion of the stiffening to prevent any rolling movement of the I-beams. Since the I-beams are held in the vertical position, they provide the maximum strength and stiffness to the frame.

It should be noted that, because of the unirigger structure, the portions of the frame between the outrigger portions 38 and the floor joists are, along with the central portion, between the unirigger and the I-beam all open. Therefore, utilities can be freely installed and extend along the length of the frame without interference by the uniriggers.

FIG. 3c illustrates the manner in which the ends of the uniriggers of this embodiment are structured for connection to the perimeter frame members 37. Adjacent to the ends of the uniriggers, the side flanges 29b are notched down at 51, as illustrated in FIG. 3c. The lateral web portion of the unirigger is then bent down from its original phantom line position to the notched portion 51, and is welded along the joint therebetween, as indicated at 52. With this structure, the end face 53 of the unirigger is positioned flat against the perimeter frame member 37 for good connection therewith.

FIGS. 4 and 4a illustrate a second embodiment. In this embodiment, a prime is added to indicate that reference is made to the second embodiment. Here, the unirigger 29' is formed as an angle member, best illustrated in FIG. 4a. Also in this embodiment, the unirigger is deformed or bent without requiring notching at the junction 51' between the outrigger portions 38' and the cross member portion 46'. Such bending can be accomplished with suitable dies without difficulty, since the angle between the two portions 46 and 38 is a relatively small angle, in the order of 17 degrees.

Here again, welds 41' are formed at the junction between the unirigger and the I-beams 26' and 27' In this particular illustrated embodiment, the ends of the uniriggers are secured directly to the floor joists 31' adjacent to their ends by suitable fasteners 52'. This attachment method between the floor joists and the ends of the uniriggers is preferred, since it directly connects the two stress-resisting members of the frame system. However, even in the first embodiment, the tensile stresses in the outrigger portions tend to pull the perimeter of frame members 37 into contact with the ends of the associated floor joists, so the connection between the floor joists and the perimeter frame member 37 is not significantly loaded by the uniriggers.

The function of the uniriggers 46' and the joists 31' in resisting rolling movement of the I-beams is identical in the first and second embodiments, and need not be repeated.

It should also be understood that the uniriggers can be formed in other cross sections. For example, FIG. 5 illustrates a unirigger providing a hat-shaped cross section 60. Since the uniriggers are not stressed in compression to any material extent, the particular configuration of the unirigger cross section is not critical to this invention.

It should also be noted that the uniriggers cooperate with the I-beams and floor joists to provide a truss-type structure which functions when the frame and the mobile home are supported at its perimeter. In such instances, it is common to provide perimeter support blocks 61' at intervals around the perimeter. In that instance, the truss structure supports the I-beam, which in turn functions to bridge between the perimeter supports and maintain a firm and straight structure. Consequently, proper support is provided even if the perimeter support blocks 61' are not accurately leveled. The I-beam in combination with the truss structure is capable of providing stiffness through a substantial distance.

With the present invention, substantial material cost savings are achieved and the frame structure is lighter in weight than comparable prior art structures. This is particularly important in frame structures which must be transported to the location in which the structure is to be installed in use. Further, the welding and fabrication costs are substantially reduced, since a single unirigger replaces a three-piece assembly, including two separate outriggers and a separate cross member.

Although the preferred embodiments of this invention have been shown and described, it should be understood that various modifications and rearrangements of the parts may be resorted to without departing from the scope of the invention as disclosed and claimed herein.

What is claimed is:

1. An elongated frame for elongated prefabricated building structures having wheels for supporting the building structure when it is moved to a use location, comprising a pair of spaced and parallel elongated metal beams extending lengthwise of said building structure, a plurality of spaced and parallel joists extending transversely with respect to said beams, said joists providing substantial strength to resist bending in planes perpendicular to said beams, said joists being supported above and secured to the upper side of said beams intermediate the ends of said joists, and one-piece elongated metal uniriggers operatively connected at their ends to associated joists substantially at the ends of said joists, said uniriggers providing outrigger portions inclined inward and downwardly from the ends thereof to the bottom of the adjacent beam and central cross member portions between said beams, said uniriggers extending below and being secured to the lower side of said beams, said uniriggers providing a relatively small substantially constant cross section providing substantial tensile strength and relatively low compressive and bending strength, said joists providing substantial bending and compressive strength, forces tending to produce rolling of said beams being resisted by tensile forces in said uniriggers and bending stresses in said joists, associated uniriggers and joists cooperating with said beams to define substantially unobstructed opening laterally to the sides of said beams and between said beams.

2. An elongated frame as set forth in claim 1, wherein said frame provides peripheral frame members mounted on the ends of said joists, and said ends of said uniriggers are connected to said peripheral frame members, tensile stresses in said uniriggers being transmitted to said joists through said peripheral frame members.

3. An elongated frame as set forth in claim 1, wherein said ends of said uniriggers are directly connected to said joists.

4. An elongated frame as set forth in claim 1, wherein said uniriggers provide a channel-shaped cross section having a central web and flanges extending laterally from said central web, and said webs are connected to the lower sides of said metal beams.

5. An elongated frame as set forth in claim 4, wherein said webs are connected to said lower sides of said metal beams by welds.

6. An elongated frame as set forth in claim 5, wherein said flanges are notched adjacent to said beams and bent at said notches so that said outrigger portions are inclined with respect to the associated of said cross member portion.

7. An elongated frame as set forth in claim 1, wherein said beams are I-beams.

8. An elongated frame as set forth in claim 1, wherein said uniriggers are bent adjacent to said beams so that said outrigger portions are inclined with respect to said cross member portions.

9. An elongated frame as set forth in claim 1, wherein said frame is supported by supports at intervals along its periphery at said use location, said joists cooperating with said beams and uniriggers to form trusses adjacent said supports holding said beams in position, said beams operating as bridges between said supports to transfer loads to said supports.

10. An elongated frame as set forth in claim 1, wherein said building structure is a mobile home.

11. An elongated mobile home frame comprising a pair of laterally spaced I-beams extending lengthwise of said frame, a plurality of wheels and axles mounted on said I-beams intermediate their ends supporting said frame, a plurality of wood floor joists extending above and mounted on the upper sides of said I-beams providing end portions extending laterally beyond said I-beams, said wooden floor joists providing substantial strength to resist bending and compression, a plurality of one-piece uniriggers operatively connected at their ends to the ends of associated floor joists, said uniriggers extending below and being welded to the lower sides of said I-beams, said uniriggers providing substantial tensile strength and low compressive strength, said uniriggers cooperating with said I-beams, and floor joists to prevent rolling of said I-beams.

12. An elongated mobile home frame as set forth in claim 11, wherein a floor is mounted on said floor joists.

13. An elongated mobile home frame as set forth in claim 12, wherein said frame includes perimeter frame members mounted on the ends of said floor joists, and said ends of said uniriggers are secured to said perimeter frame members, tensile stresses in said uniriggers being transmitted to said joists through said perimeter frame members.

14. An elongated mobile home frame as set forth in claim 12, wherein said ends of said uniriggers are directly connected to said floor joists substantially adjacent to the ends of said floor joists.

15. An elongated mobile home frame as set forth in claim 11, wherein said uniriggers have a substantially uniform cross section throughout their length.

* * * * *